(12) United States Patent
Hamamura (10) Patent No.: US 7,620,314 B2
(45) Date of Patent: Nov. 17, 2009

(54) PHOTOGRAPHING APPARATUS AND METHOD

(75) Inventor: Toshihiro Hamamura, Yokohama (JP)

(73) Assignee: Samsung Digital Imaging Co., Ltd., Suwon-si (KR)

(*) Notice: Subject to any disclaimer, the term of this patent is extended or adjusted under 35 U.S.C. 154(b) by 589 days.

(21) Appl. No.: 11/591,075

(22) Filed: Oct. 31, 2006

(65) Prior Publication Data

US 2007/0147824 A1 Jun. 28, 2007

(30) Foreign Application Priority Data

Dec. 27, 2005 (JP) ............................. 2005-373711

(51) Int. Cl.
*G03B 7/091* (2006.01)
(52) U.S. Cl. .................................................. 396/222
(58) Field of Classification Search ................ 396/213, 396/222, 233, 234; 348/362–366
See application file for complete search history.

(56) References Cited

U.S. PATENT DOCUMENTS 5,309,243 A * 5/1994 Tsai ......................... 348/221.1
5,486,893 A * 1/1996 Takagi ........................ 396/147
6,212,336 B1 * 4/2001 Tanaka et al. ................ 396/213
6,496,226 B2 * 12/2002 Takahashi et al. ........... 348/362
7,349,119 B2 * 3/2008 Tsukioka .................... 358/1.18
2006/0216016 A1 * 9/2006 Eun ............................ 396/222

FOREIGN PATENT DOCUMENTS

| JP | 11-271838 A | 10/1999 |
| JP | 2002-044515 A | 2/2002 |
| JP | 2002-084444 A | 3/2002 |
| JP | 2003-259200 A | 9/2003 |

* cited by examiner

*Primary Examiner*—W B Perkey
(74) *Attorney, Agent, or Firm*—Drinker Biddle & Reath LLP

(57) ABSTRACT

Provided are a photographing apparatus and method which can obtain the same effect as in a weighted summation method by capturing a plurality of images of a subject while appropriately controlling exposure time for each of the images and adding up the images and can correct distortions in the images obtained using a typical exposure time division method. The photographing apparatus includes: an exposure compensation value calculation unit which calculates a plurality of exposure compensation values for a plurality of exposure operations respectively corresponding to a plurality of diaphragm values based on a predefined parameter; an exposure unit which respectively performs the exposure operations for exposure times determined based on the exposure compensation values; and an image synthesis unit which synthesizes a plurality of images respectively obtained by the exposure operations.

18 Claims, 6 Drawing Sheets

FIG. 1

FRONT ← → REAR

FRONT ← → REAR

FIG. 6

FRONT ←————————————→ REAR

PHOTOGRAPHING APPARATUS AND METHOD

CROSS-REFERENCE TO RELATED PATENT APPLICATION

This application claims the benefit of Japanese Patent Application No. 2005-373711, filed on Dec. 27, 2005, in the Japanese Patent Office, the disclosure of which is incorporated herein in its entirety by reference.

BACKGROUND OF THE INVENTION

1. Field of the Invention

The present invention relates generally to a photographing apparatus and method, and more particularly, to a photographing apparatus and method in which a synthesized image is obtained by synthesizing a plurality of images that correspond to a respective plurality of diaphragm values.

2. Description of the Related Art

There are conventional photographing methods of photographing a subject while opening up a diaphragm of a photographing apparatus. These conventional photographing methods are useful for capturing an image of a plurality of subjects while emphasizing one of the subjects.

Figure 1:
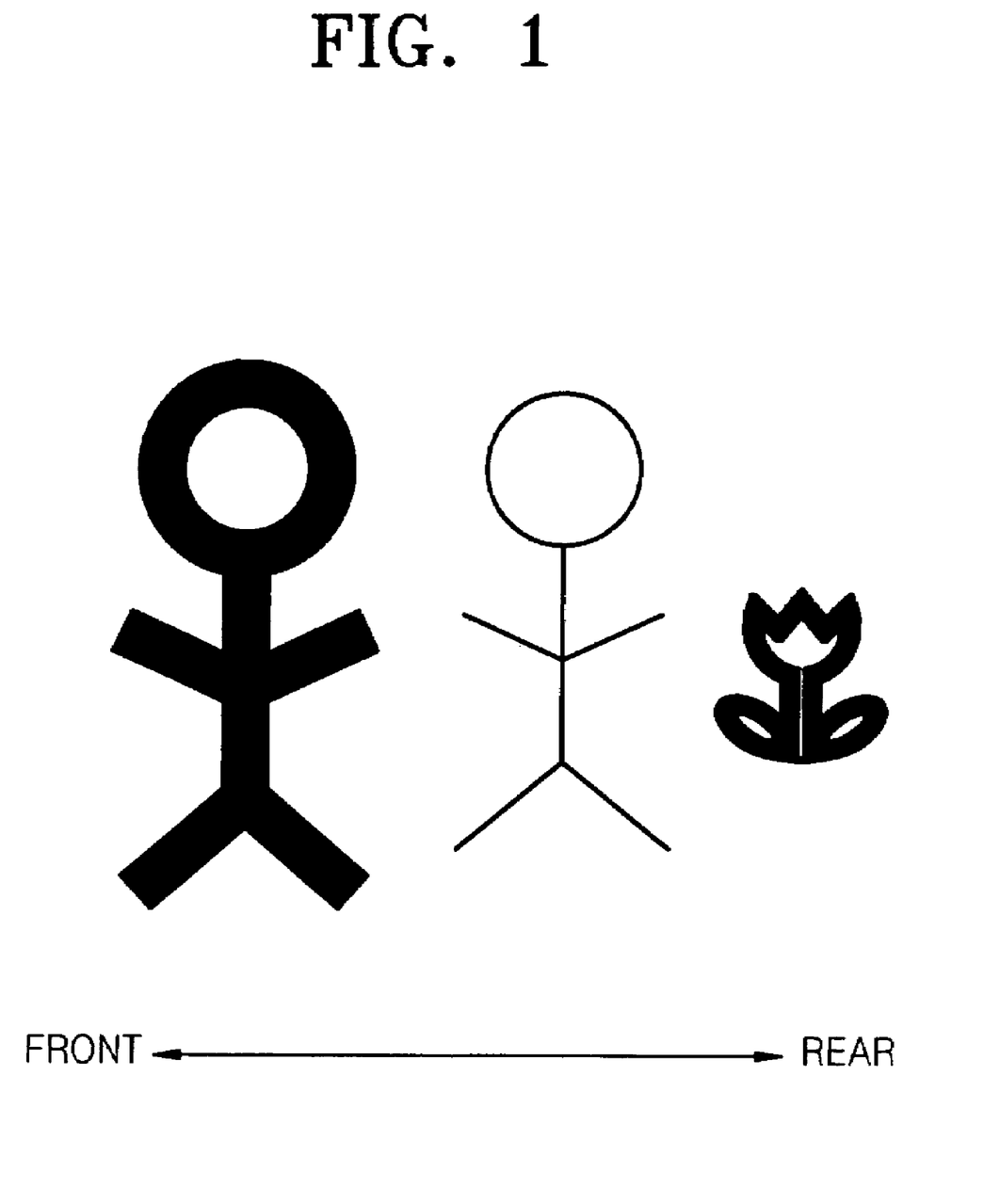
FIG. 1 is a diagram for explaining a conventional method of synthesizing a plurality of images.

When a photographing apparatus captures an image of a plurality of subjects while a diaphragm of the photographing apparatus is opened up, the subjects which are in focus appear clearly on the image as illustrated by the middle thin-lined illustration of FIG. 1, whereas the subjects which are out-of-focus appear blurry on the image as illustrated by the thick-lined illustrations on the far right side and on the far left side of FIG. 1. In this case, it may be difficult to determine the original shapes of some of the subjects on the image.

In order to address this problem with the aforementioned conventional photographing methods, a photographing method has been suggested which involves capturing a plurality of images respectively corresponding to a plurality of diaphragm values and obtaining a synthesized (i.e., combined or composite) image by synthesizing (i.e., combining) the images.

As an example of this type of synthesis-based photographing method, Japanese Patent Laid-Open Gazette No. hei 11-271838 discloses a photographing method which involves respectively performing a plurality of exposure operations using a plurality of combinations of diaphragm values and shutter speeds by pressing a shutter-release button once. Japanese Patent Laid-Open Gazette No. 2002-084444 discloses a photographing method which involves performing a photographing operation in an ordinary photographing mode and a multi-image photographing mode, respectively, and synthesizing a plurality of images obtained by the photographing operations.

Also, Japanese Patent Laid-Open Gazette No. 2003-259200 discloses a photographing method which involves determining exposure conditions based on a photographing algorithm or method other than a typical photographing algorithm or method, and synthesizing a plurality of images obtained by performing a plurality of exposure operations while slightly varying the exposure conditions from one exposure operation to another. Japanese Patent Laid-Open Gazette No. 2002-044515 discloses a photographing method in which a synthesized image having an arbitrary image data synthesis rate can be obtained by synthesizing two sets of image data respectively corresponding to two different exposure times using a multiplier.

However, in order to obtain a synthesized image having an arbitrary image data synthesis rate by synthesizing two sets of image data respectively corresponding to two different exposure times using a multiplier, the two sets of image data must be appropriately processed in pixel units, thus increasing the time taken to obtain a synthesized image. Also, a conventional photographing method which involves synthesizing a plurality of images using a typical exposure time division method is likely to produce low-quality synthesized images.

SUMMARY OF THE INVENTION

The present invention provides a photographing apparatus and a photographing method which can achieve the same effect as in a weighted summation method by capturing a plurality of images of a subject while appropriately controlling exposure time for each of the images and simply adding up the images, which can correct distortions in images obtained using a typical exposure time division method.

According to an aspect of the present invention, there is provided a photographing apparatus comprising: an exposure compensation value calculation unit which calculates a plurality of exposure compensation values for a plurality of exposure operations that correspond to a respective plurality of diaphragm values based on a predefined parameter; an exposure unit which respectively performs the exposure operations for exposure times determined based on the exposure compensation values; and an image synthesis unit which synthesizes a plurality of images respectively obtained by the exposure operations.

The photographing apparatus may further comprise a manipulation unit which a user may actuate to operate the photographing apparatus, wherein the exposure operations may be performed for a single photographing operation initiated by manipulation by the manipulation unit. The exposure operations may also be performed for a plurality of consecutive photographing operations initiated by manipulation by the manipulation unit.

The photographing apparatus may further comprise a photographing mode selection unit which chooses one of a plurality of photographing modes, wherein a plurality of diaphragm values and exposure times for the respective exposure operations are determined according to the photographing mode that is selected by the user.

The photographing apparatus may further comprise an effect level setting unit which sets an effect level corresponding to the predefined parameter for a synthesized image obtained by the image synthesis unit, wherein the exposure times for the respective exposure operations are determined according to the effect level set by the effect level setting unit.

The photographing apparatus may further comprise an image optimization unit which performs an optimization operation before and/or after the synthesizing of the images respectively obtained by the exposure operations.

The optimization operation may comprise a misalignment correction operation whereby a plurality of images that are misaligned with one another are properly aligned with one another so that a subject on one image can coincide with the same subject as captured on another (e.g., previous and/or subsequent) image.

The optimization operation may comprise a brightness correction operation by which image data is optimized to have a predetermined brightness level. The optimization operation may also comprise a color balance correction operation by which image data is optimized to have an optimum color balance.

According to another aspect of the present invention, there is provided a photographing method comprising: calculating a plurality of exposure compensation values for a plurality of exposure operations respectively corresponding to a plurality of diaphragm values based on a predefined parameter; and respectively performing the exposure operations for a plurality of exposure times determined based on the exposure compensation values.

The photographing method may further comprise: synthesizing a plurality of images respectively obtained by the exposure operations; and performing an optimization operation before and/or after the synthesizing.

DETAILED DESCRIPTION OF THE EMBODIMENTS

The present invention will now be described more fully with reference to the accompanying drawings in which exemplary embodiments of the invention are shown. In the drawings, like reference numerals represent like elements, and thus, their detailed descriptions will be not be repeated for brevity.

Figure 2:
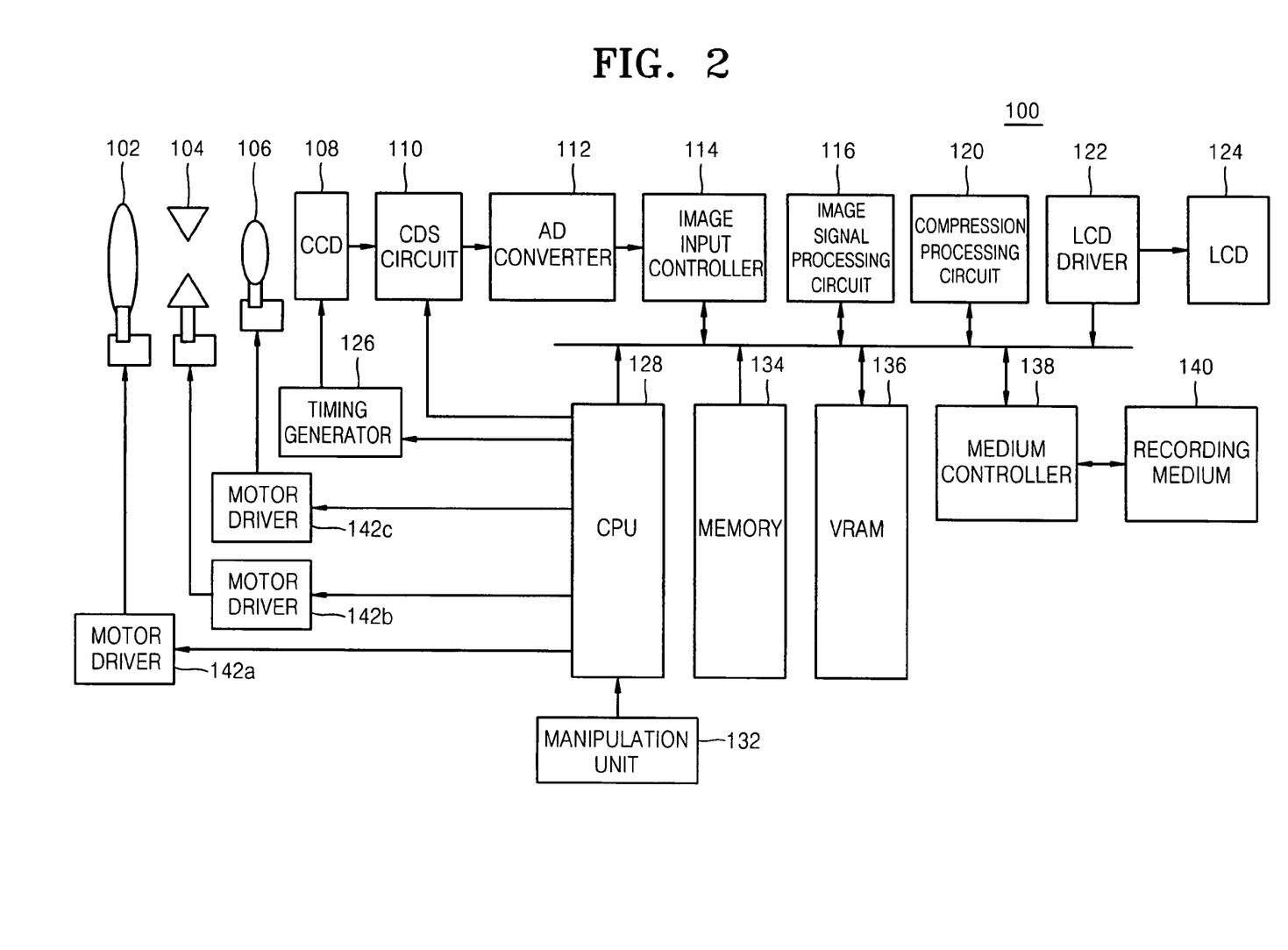
FIG. 2 is a block diagram of an example photographing apparatus according to an embodiment of the present invention.

FIG. 2 is a block diagram of an example photographing apparatus 100 according to an embodiment of the present invention. Referring to FIG. 2, the photographing apparatus 100 includes a zoom lens 102, a diaphragm 104, a focal lens 106, a charge coupled device (CCD) 108, a correlated double sampling (CDS) circuit 110 integrated with an amplifier, an analog-to-digital (A/D) converter 112, an image input controller 114, an image signal processing circuit 116, a compression processing circuit 120, a liquid crystal display (LCD) driver 122, an LCD 124, a timing generator 126, a plurality of motor drivers 142a, 142b, and 142c, a central processing unit (CPU) 128, a manipulation unit 132, a memory 134, a video random access memory (VRAM) 136, a medium controller 138, and a recording medium 140.

Here, the zoom lens 102, the diaphragm 104, the focal lens 106, and the CCD 108 constitute an exposure unit.

According to the present embodiment, the exposure unit is comprised of the CCD 108, however, the present invention is not restricted thereto. For example, the exposure unit may be comprised of a complementary metal oxide semiconductor (CMOS) device instead of a CCD. Since a CMOS device can convert image light corresponding to a subject into an electrical signal more quickly than a CCD, a photographing apparatus including an exposure unit comprised of a CMOS device can reduce the time taken to synthesize a plurality of images of the subject after photographing the subject considerably more than a photographing apparatus including an exposure unit comprised of a CCD.

The zoom lens 102 is a lens with a focal length that can be continuously varied by moving the lens in the direction of the optical axis of the lens. The zoom lens 102 can change the size of an image of a subject. The diaphragm 104 adjusts the amount of light incident on the CCD 108 when photographing the subject. The focal lens 106 can be moved in the direction of the optical axis of the focal lens 106 and can thus bring the subject into focus.

The motor drivers 142a, 142b, and 142c respectively control a plurality of motors which drive the zoom lens 102, the diaphragm 104, and the focal lens 106. Thus, it is possible for a user of the apparatus 100 to adjust the size of an image of the subject, the amount of light passing through the zoom lens 102, an opening of the diaphragm 104, and the focal lens 106 and bring the subject into focus.

The CCD 108 converts into an electrical signal a light that is passed through the zoom lens 102, the opening of the diaphragm 104, and the focal lens 106. According to the present embodiment, an electrical signal extraction time, representing how long an electrical signal is to be continuously extracted from incident light, is adjusted using an electronic shutter to control the incident light. Alternatively, the electrical signal extraction time may be adjusted by using a mechanical shutter.

The CDS circuit 110 is a circuit into which a typical CDS circuit (i.e., a type of sampling circuit that removes noise from an electrical signal output by the CCD 108) and an amplifier (i.e., which amplifies the result of the removal performed by the CDS circuit) are integrated. According to the present embodiment, the CDS circuit 110 is a single circuit into which a typical CDS circuit and an amplifier are integrated. Alternatively, the CDS circuit 110 may be a typical CDS circuit and an amplifier that are separate.

The A/D converter 112 converts the electrical signal output by the CCD 108 into a digital signal, thereby generating raw image data.

The image signal processing circuit 116, which is a type of image synthesizer, synthesizes a plurality of images of the subject obtained by the photographing apparatus 100.

The compression processing circuit 120 compresses a synthesized image obtained from the image signal processing circuit 116 into image data having a predetermined format using either a reversible compression method or an irreversible compression method. The predetermined format may be the Joint Photographic Experts Group (JPEG) format or the JPEG 2000 format.

The LCD 124 displays a live view before a photographing operation, displays various settings screens for the photographing apparatus 100, or images captured by the photographing apparatus 100. Image data or various information regarding the photographing apparatus 100 may be displayed by the LCD 124 with the aid of the LCD driver 122.

The timing generator 126 inputs a timing signal to the CCD 108. Then the CCD 108 determines a shutter speed in response to the timing signal input by the timing generator 126. In other words, the driving of the CCD 108 is controlled by the timing signal from the timing generator 126. In this way, the CCD 108 is driven in response to the timing signal to receive image light corresponding to the subject and generate an electrical signal, based on which, image data is formed.

The CPU 128 executes commands of signal system regarding the CCD 108 or the CDS circuit 110 or executes commands of manipulation system regarding the manipulation unit 132. According to the present embodiment, the photographing apparatus 100 includes only one CPU. However, the photographing apparatus 100 may also include two or more CPUs so that signal system's commands and manipulation system's commands can be executed by different CPUs.

The manipulation unit 132 or user interface serves as, among other things, a photographing mode selection unit. The manipulation unit 132 may include a plurality of modules (e.g., buttons, switches, etc.) for manipulating operation of the photographing apparatus 100 and/or determining various settings for the photographing apparatus 100. Examples of the modules include a power button, a cross key and a select button for choosing a photographing mode or a photographing drive mode and for setting a variety of effect parameters, and a shutter button for initiating a photographing operation.

The memory 134, which is an example of an image memory unit, temporarily stores images captured by the photographing apparatus 100. In the present apparatus 100, synthesized images (i.e., images obtained by a synthesization operation that is performed by the image signal processing circuit 116) may be stored in the memory 134 as well. The memory 134 has a storage capacity large enough to store a plurality of images therein. The reading/writing of image data from/to the memory 134 may be controlled by the image input controller 114.

The VRAM 136 maintains data that is being displayed by the LCD 124. The resolution of the LCD 124 and the maximum number of colors that can be displayed by the LCD 124 may be dependent on the storage capacity of the VRAM 136.

The recording medium 140, which is an example of an image storage unit, stores images captured by the photographing apparatus 100 or synthesized images obtained by a synthesization operation that is performed by the image signal processing circuit 116. The reading/writing of image data from/to the recording medium 140 may be controlled by the medium controller 138. A memory card, which is a removable card-type storage device using a flash memory, may be used as the recording medium 140.

The structure of the photographing device 100 has been described so far with reference to FIG. 2. The CPU 128 illustrated in FIG. 2 will now be described in detail with reference to FIG. 3.

Figure 3:
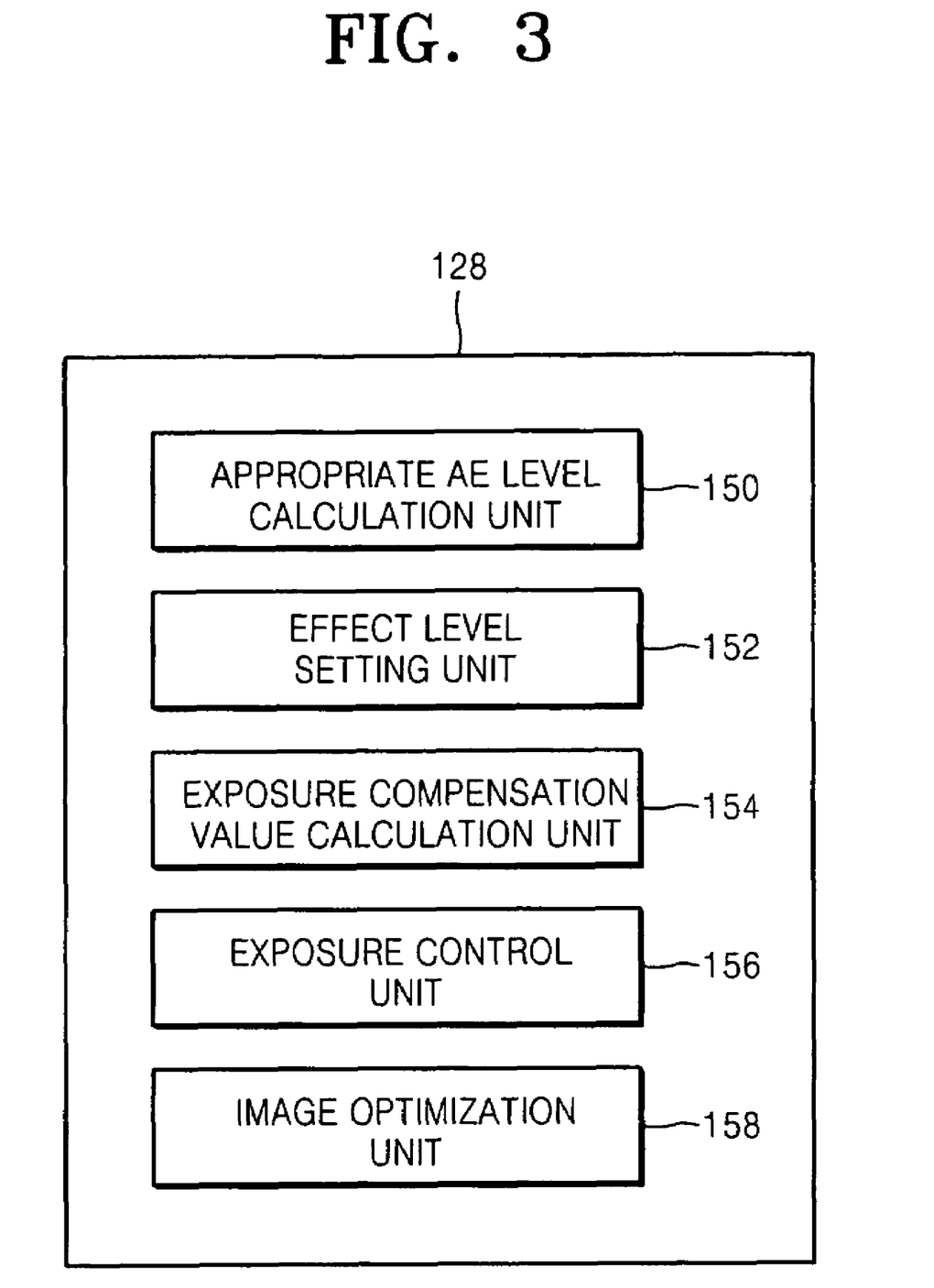
FIG. 3 is a block diagram of an example central processing unit (CPU) illustrated in FIG. 2, according to an embodiment of the present invention.

FIG. 3 is a block diagram of the CPU 128 illustrated in FIG. 2, according to an embodiment of the present invention. As shown, the CPU 128 includes an appropriate auto-exposure (AE) level calculation unit 150, an effect level setting unit 152, an exposure compensation value calculation unit 154, an exposure control unit 156, and an image optimization unit 158.

The appropriate AE level calculation unit 150 performs an AE operation for the photographing apparatus 100 and obtains or determines an exposure value. Thereafter, an appropriate exposure time and a shutter speed T can be determined based on the obtained exposure value. Assuming that, when the exposure value is equal to 0 and a diaphragm value and shutter speed are respectively set to F1 and 1 sec, appropriate exposure light can be obtained, the exposure value can be altered by appropriately altering a diaphragm value and shutter speed. The exposure value can be determined by the following equation:

$$EV = \log_2 \frac{F^2}{T}$$

where EV represents the exposure value, F represents a diaphragm value, and T represents shutter speed. Therefore, when the diaphragm value F is constant, by making the shutter speed T faster (i.e., a value between zero and one), the exposure value EV increases. On the other hand, when the shutter speed T is constant, by increasing the diaphragm value F, the exposure value EV also increases.

The effect level setting unit 152 sets an "effect parameter" to a predetermined level/value according to the user's actuation of the manipulation unit 132. According to the present embodiment, the effect level setting unit 152 may set the effect parameter to one of 6 levels (e.g., ranging from level 0 to level 5) as shown in Table 1 hereinafter. However, the effect parameter may be set to fewer or additional levels or another set of 6 levels as desired. The effect level setting unit 152 may set the effect parameter to a default value (e.g., a level/value that is determined at the factory) or to an arbitrary value determined by a user with the aid of the manipulation unit 132.

The exposure compensation value calculation unit 154 determines the ratio between an exposure time necessary for obtaining a "wide open-diaphragm image" and an exposure time necessary for obtaining a "narrowly open-diaphragm image," based on the effect parameter level set by the effect level setting unit 152. Here, the wide open-diaphragm image is an image captured when the diaphragm 104 is widely opened, whereas the narrowly open-diaphragm image is an image captured when the diaphragm 104 is narrowly opened. The wide open-diaphragm image corresponds to a low diaphragm value, and the narrowly open-diaphragm image corresponds to a high diaphragm value. For example, the wide open-diaphragm image may correspond to a diaphragm value of about F2.0, and the narrowly open-diaphragm image may correspond to a diaphragm value of about F8.0.

Table 1 shows how the 6 previously-mentioned effect parameter levels correspond to a plurality of exposure time ratios of a wide open-diaphragm image and a narrowly open-diaphragm image. However, as should be appreciated, the present invention is not restricted to Table 1.

TABLE 1

| Effect Parameter Levels | Wide Open-Diaphragm Images | Narrowly Open-Diaphragm Images |
| --- | --- | --- |
| 0 | 0% | 100% |
| 1 | 30% | 70% |
| 2 | 40% | 60% |
| 3 | 50% | 50% |
| 4 | 60% | 40% |
| 5 | 70% | 30% |

Here, the higher the effect parameter level is, the higher the ratio of a wide open-diaphragm image to a synthesized image becomes, where the synthesized image is obtained by synthesizing the wide open-diaphragm image and a narrowly open-diaphragm image. The higher the ratio of the wide open-diaphragm images to the synthesized image is, the more the synthesized image goes out of focus and the blurrier the synthesized image becomes. On the other hand, the lower the effect parameter level is, the less the synthesized image goes out of focus, and the less blurry the synthesized image becomes. When the effect parameter is set to level 0, only one image of the subject is captured (i.e., the narrowly opened-diaphragm image) by the photographing apparatus 100. In this case, a second image of the subject is not captured, and an image synthesis operation is not performed.

The exposure control unit 156 determines actual exposure times for a wide open-diaphragm image and a narrowly open-diaphragm image based on appropriate exposure values respectively determined for a wide open-diaphragm image and a narrowly open-diaphragm image by the appropriate AE level calculation unit 150. The exposure control unit 156 further determines the exposure time ratio between a wide open-diaphragm image and a narrowly open-diaphragm image as determined by the exposure compensation value calculation unit 154, and subsequently controls image light which is received from the subject (and which is incident on the CCD 108) according to the results of the determination.

For example, if the appropriate exposure time determined by the appropriate AE level calculation unit 150 for a wide open-diaphragm image is 1/250 of a second, the appropriate exposure time determined for a narrowly open-diaphragm image by the appropriate AE level calculation unit 150 is 1/30 of a second and the effect parameter is set to level 3. Thus, an actual exposure time for a wide open-diaphragm image is automatically set to 1/500 sec (=1/250×50%), and an actual exposure time for a narrowly open-diaphragm image is automatically set to 1/60 sec (=1/30×50%).

The image optimization unit 158 optimizes images captured by the photographing apparatus 100. Examples of the optimization include brightness correction (e.g., in which the gray scale of an image is appropriately converted so that the image can have a predetermined brightness level), misalignment correction (e.g., in which it is determined whether a plurality of images of a subject are misaligned with one another and, if the images are determined to be misaligned with one another, the images are corrected so that the subject on one image can coincide with the subject on another image), and color balance correction (e.g., in which RGB properties of image data are detected and the image data is appropriately converted into image data having an appropriate color balance based on the detected RGB properties).

The structure and operation of the CPU 128 illustrated in FIG. 2 have been described so far with reference to FIG. 3. A photographing method according to an embodiment of the present invention will now be described in detail with reference to FIGS. 2 and 4.

Figure 4:
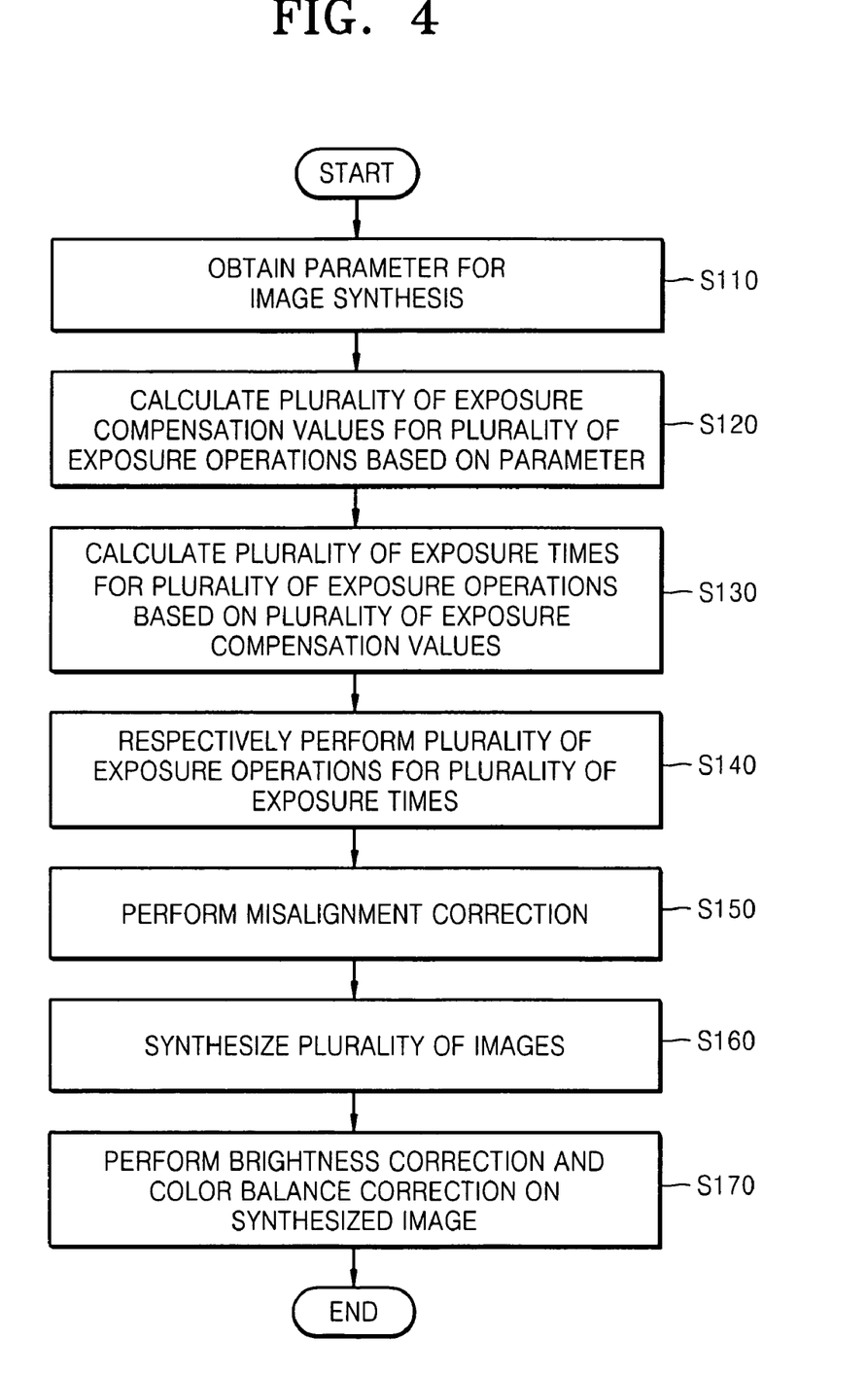
FIG. 4 is a flowchart illustrating an example photographing method according to an embodiment of the present invention.

FIG. 4 is a flowchart illustrating an example photographing method according to an embodiment of the present invention. The photographing method involves performing an image synthesis (i.e., combination or composite) function (hereinafter referred to as a "new image realization function") with reference to a menu screen displayed by the LCD 124 (FIG. 2). According to the present embodiment, the new image realization function comprises capturing two images of a subject and synthesizing the two images. However, the new image realization function may comprise capturing additional (e.g., three or more) images.

When the new image realization function is set, an effect parameter indicating the degree of effect of synthesization can be set to one of a plurality of levels. According to the present embodiment, the effect parameter can be set to one of a total of six levels ranging from level 0 to level 5, however fewer or additional levels may be provided.

When the new image realization function is set and the effect parameter is set to one of the six levels, two or more images of a subject are captured according to the result of the setting of the effect parameter. If a current photographing drive mode is a single mode, two images of the subject are captured by actuating a shutter button two times in a row. On the other hand, if the current photographing drive mode is a consecutive photographing mode, two images of the subject are captured by actuating the shutter button one time.

A diaphragm value is determined depending on what photographing mode the photographing apparatus 100 is currently set to. According to the present embodiment, four photographing modes are provided for the photographing apparatus 100. The four photographing modes are: a P-priority mode where P denotes photographing; a diaphragm-priority mode; an SS-priority mode where SS denotes shutter speed; and a manual mode. Although four modes are described, fewer or additional modes may be provided.

The P-priority mode is a photographing mode in which the photographing apparatus 100 automatically determines a diaphragm value and a shutter speed according to the brightness of the subject, i.e., an exposure value. Combinations of a plurality of diaphragm values and a plurality of shutter speeds draw a program line when being illustrated on a graph.

The diaphragm-priority mode is a photographing mode in which the CPU 128 of the photographing apparatus 100 automatically determines a shutter speed according to a diaphragm value that is set by a user.

The SS-priority mode is a photographing mode in which the CPU 128 of the photographing apparatus 100 automatically determines a diaphragm value according to a shutter speed that is set by the user.

The manual mode is a photographing mode in which the user arbitrarily sets a diaphragm value and a shutter speed.

A method of determining a diaphragm value when capturing a plurality of images of the subject will now be described in detail for each of the four forgoing photographing modes.

A method of determining a diaphragm value when capturing a plurality of images of the subject in the P-priority mode will now be described in detail. When the P-priority mode is chosen, image light corresponding to the subject is measured, and a predetermined diaphragm value and a predetermined shutter speed are chosen from a typical program line based on the results of the measurement. Thereafter, a first image of the subject is captured according to the chosen diaphragm value and the chosen shutter speed. Next, it is determined whether a diaphragm value corresponding to a wide open diaphragm (hereinafter referred to as the wide open-diaphragm value) or a diaphragm value corresponding to a narrowly open diaphragm (hereinafter referred to as the narrowly open-diaphragm value) can produce a clearer image of the subject, and a second image of the subject is captured according to whichever of the wide open-diaphragm value and the narrowly open-diaphragm value is determined to produce a clearer image of the subject.

In an example, a diaphragm value of F2.8 and a shutter speed of 1/250 seconds are chosen for a first image of the subject based on the results of the measurement of the image light corresponding to the subject. Next, it is determined whether a wide open-diaphragm value or a narrowly open-diaphragm value can produce a clearer image of the subject. If the narrowly open-diaphragm value is determined to be able to produce a clearer image of the subject than the wide open-diaphragm value, the narrowly open-diaphragm value (e.g., a diaphragm value of F5.6 or F8) is chosen and a second image of the subject is captured according to the chosen diaphragm value.

A method of determining a diaphragm value when capturing a plurality of images of the subject in the diaphragm-priority mode will now be described in detail. When the diaphragm-priority mode is chosen, a first image of the subject is captured according to a diaphragm value set by a user and a shutter speed determined by the apparatus 100. Thereafter, it is determined whether a wide open-diaphragm value or a narrowly open-diaphragm value can produce a clearer image of the subject, and a second image of the subject is captured according to whichever of the wide open-diaphragm value and the narrowly open-diaphragm value is determined to produce a clearer image of the subject.

In another example, a first image of the subject is captured according to the diaphragm value set by the user (e.g., a diaphragm value of F8). Thereafter, it is determined whether a wide open-diaphragm value or a narrowly open-diaphragm value can produce a clearer image of the subject. If the CPU 128 (FIG. 2) determines that the narrowly open-diaphragm value can produce a clearer image of the subject than the wide open-diaphragm value and that a minimal diaphragm value is F2.8, the minimal diaphragm value is chosen, and a second image of the subject is captured according to the minimal diaphragm value.

A method of determining a diaphragm value when capturing a plurality of images of the subject in the SS-priority mode will now be described in detail. When the SS-priority mode is chosen, an optimum diaphragm value is chosen according to a shutter speed set by a user so that a first image of the subject can be captured with appropriate exposure light. Thereafter, it is determined whether a wide open-diaphragm value or a narrowly open-diaphragm value can produce a clearer image of the subject, and a second image of the subject is captured according to whichever of the wide open-diaphragm value and the narrowly open-diaphragm value is determined to be able to produce a clearer image of the subject.

In yet another example, if the shutter speed set by the user is 1/60 of a second and the CPU 128 of the photographing apparatus 100 measures image light corresponding to the subject and determines a diaphragm value of F2.8 as being optimum for the subject based on the results of the measurement, a first image of the subject is captured according to a diaphragm value of F2.8. Thereafter, whichever of a wide open-diaphragm value and a narrowly open-diaphragm value is determined to produce a clearer image of the subject is chosen. If the CPU 128 determines that the narrowly open-diaphragm value can produce a clearer image of the subject than the wide open-diaphragm value, a second image of the subject is captured according to the narrowly open-diaphragm value, e.g., a diaphragm value of F5.6 or F8.

And finally, a method of determining a diaphragm value when capturing a plurality of images of the subject in the manual mode will now be described in detail. When the manual mode is chosen, a first image of the subject is captured according to a diaphragm value and shutter speed set by a user, and a second image of the subject is captured according to whichever of a wide open-diaphragm value and a narrowly-open diaphragm value is determined to produce a clearer image of the subject.

For example, a first image of the subject is captured according to the diaphragm value and the shutter speed set by the user, e.g., a diaphragm value of F5.6 and a shutter speed of 1/60 sec. Thereafter, whichever of a wide open-diaphragm value and a narrowly open-diaphragm value is determined to be able to produce a clearer image of the subject is chosen. If the CPU 128 determines that the wide open-diaphragm value can produce a clearer image of the subject than the wide open-diaphragm value and a minimal diaphragm value provided by the photographing apparatus 100 is F2.8, the minimal diaphragm value is chosen, and a second image of the subject is captured according to the minimal diaphragm value.

FIG. 4 is a flowchart illustrating a photographing method according to an embodiment of the present invention. Referring to FIG. 4, in operation S110, when a user takes an image of a subject by pressing a shutter button (e.g., which may be included in the manipulation unit 132), the effect level setting unit 152 sets an effect parameter level. In operation S120, the exposure compensation value calculation unit 154 calculates an exposure compensation value for each of a plurality of exposure operations to be performed based on the effect parameter level that was previously set by the effect level setting unit 152. In operation S130, the exposure control unit 156 respectively determines a plurality of exposure times for the exposure operations to be performed based on the exposure compensation values.

Next, a method of respectively determining a plurality of exposure times for a plurality of exposure operations to be performed will now be described in detail. As described above, the exposure times for the respective exposure operations to be performed are determined based on the exposure compensation values provided by the exposure compensation value calculation unit 154.

For example, when the effect parameter level that is determined by the effect level setting unit 152 is level 3 (Table 1), the exposure time ratio between a wide open-diaphragm image and a narrowly open-diaphragm image is 5:5. Therefore, assuming that an appropriate diaphragm value and appropriate exposure time for a first exposure operation to be performed are respectively F2.8 and 1/1000 sec and an appropriate diaphragm value and appropriate exposure time for a second exposure operation to be performed are respectively F8 and 1/60 sec, the actual exposure time for the first exposure operation is set to 1/2000 sec (=1/1000×50%), and actual exposure time for the second exposure operation is set to 1/120 sec (=1/60×50%).

On the other hand, when the effect parameter level set by the effect level setting unit 152 is level 5, the exposure time ratio between a wide open-diaphragm image and a narrowly open-diaphragm image is 7:3. Therefore, assuming that the appropriate diaphragm value and the appropriate exposure time for the first exposure operation are respectively F2.8 and 1/1000 sec and the appropriate diaphragm value and the appropriate exposure time for the second exposure operation are respectively F8 and 1/60 sec, actual exposure time for the first exposure operation is set to 7/10000 sec (=1/1000×70%), and actual exposure time for the second exposure operation is set to 1/200 sec (=1/60×30%).

Referring to FIG. 4, in operation S140, a plurality of exposure operations are respectively performed according to the results of the determination performed in operation S130, thereby obtaining a plurality of images of the subject.

The CCD 108 receives image light corresponding to a subject based on the diaphragm value and the shutter speed set as above. In detail, the image light corresponding to the subject passes through the zoom lens 102, the diaphragm 104, and the focal lens 106, and is thus incident on the CCD 108. Then the CCD 108 converts the image light corresponding to the subject into an electrical signal.

The CDS circuit 110 removes noise from the output signal of the CCD 108, and amplifies the result of the removal. The A/D converter 112 converts the output signal of the CDS circuit 110 into a digital signal. The image input controller 114 stores image data corresponding to the digital signal in the memory 134.

If the capturing of two images of the subject is concluded and the two images are stored in the memory 134, the image signal processing circuit 116 synthesizes the two images, thereby obtaining a synthesized image. Since the time taken to obtain a synthesized image by adding a plurality of images is shorter than the time taken to obtain a synthesized image by respectively applying a plurality of weights to the images and adding the results of the application of the weights, the image signal processing circuit 116 may obtain the synthesized image simply by adding the two images, thereby maximizing user convenience.

Figure 5:
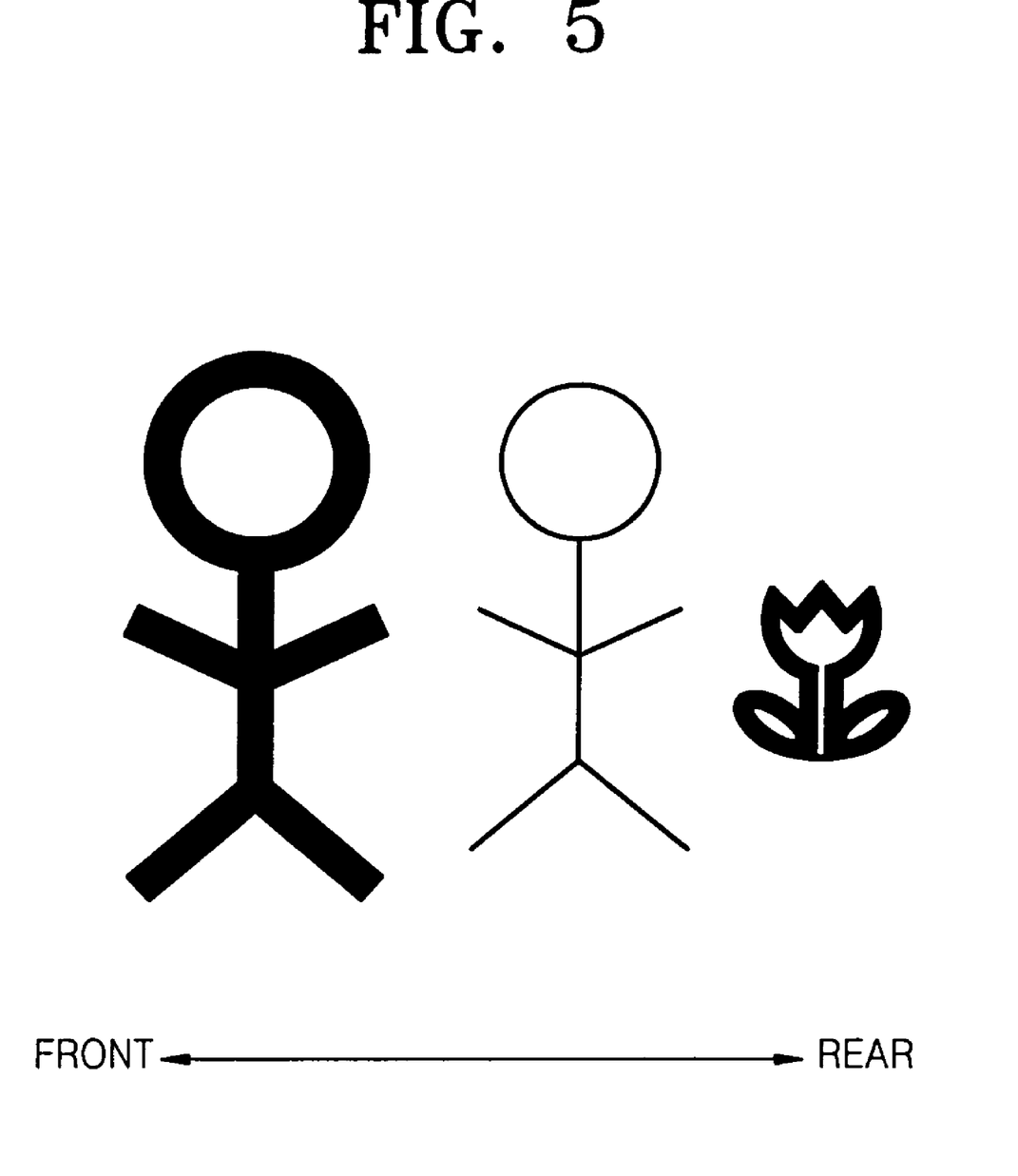
FIG. 5 is a diagram for explaining the photographing method illustrated in FIG. 4, according to an embodiment of the present invention.
Figure 6:
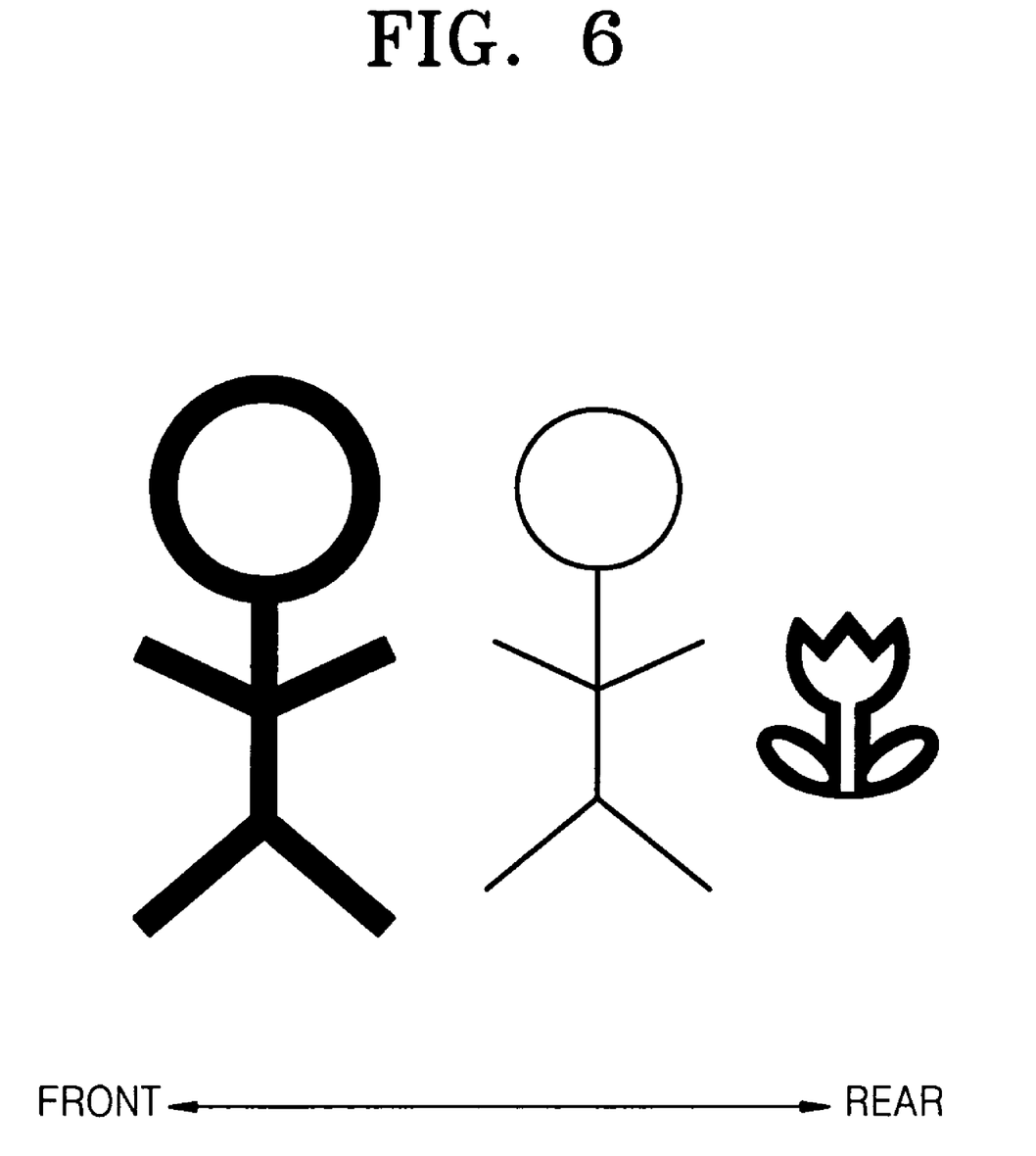
FIG. 6 is a diagram for explaining the photographing method illustrated in FIG. 4, according to another embodiment of the present invention.

FIGS. 5 and 6 are diagrams illustrating a plurality of images obtained using the photographing method according to an embodiment of the present invention. Specifically, FIG. 5 illustrates a plurality of images obtained when an effect parameter is set to level 3, thereby preventing blurriness of images which are out of focus. The image of a person on the far left side of FIG. 5 and the image of a flower on the far right side of FIG. 5 are less blurry when compared to their respective counterparts illustrated in FIG. 1. FIG. 6 illustrates a plurality of images obtained using the photographing method according to an embodiment of the present invention when the effect parameter is set to level 1, thereby further preventing blurriness of images which are out of focus. The image of a person on the far left side of FIG. 6 and the image of a flower on the far right side of FIG. 6 are less blurry when compared to their respective counterparts illustrated in FIG. 5.

Referring to FIG. 4, in operation S150, it is determined whether the images of the subject obtained in operation S140 are misaligned with one another because of, for example, the user's hands shaking when the user captures the corresponding images, and thus, the subject on one image does not coincide with the subject on another image. If the images of the subject are determined to be misaligned with one another, misalignment correction is performed on the images of the subject. In operation S160, the image signal processing circuit 116 obtains a synthesized image by synthesizing the misalignment-corrected images of the subject while ensuring that the subject on one image coincides with the subject on another image. By performing misalignment correction, it is possible to prevent deterioration of the quality of a synthesized image even when the synthesized image is obtained from a plurality of images which are misaligned with one another because of the user's hands shaking when the user captures the images resulting in a subject on one image not coinciding with the subject on another image.

Thereafter, in operation S170, the image optimization unit 158 optimizes the synthesized image obtained by the image signal processing circuit 116. Examples of the optimization of the synthesized image include brightness correction and color balance correction.

Brightness correction is a process of measuring the brightness of a subject and converting the gray scale of an image of a subject to a predetermined brightness level based on the results of the measurement. The measurement of the brightness of the subject may be performed using a typical AE method, and the conversion of the gray scale of the image of the subject may be performed using a gamma conversion method.

Color balance correction is a process of detecting the RGB balance of a subject, adjusting RGB gains so that an image of the subject can remain within a predetermined neutral gray range and can have an appropriate color balance level. Color balance correction may be performed using a typical auto white balance method. By performing color balance correction, it is possible to prevent a synthesized image from being generated with a color balance level other than a color balance level desired by a user.

In short, the image optimization unit 158 optimizes the synthesized image obtained by the image signal processing circuit 116, thereby preventing deterioration of the images synthesized into the synthesized image.

Once the optimization operation which is performed by the image optimization unit 158 on the synthesized image is complete, the compression processing circuit 120 compresses the synthesized image into image data having a predetermined format. The compression of the synthesized image may be performed using either a reversible method or an irreversible method. Examples of the predetermined format include the JPEG format and the JPEG 2000 format.

Thereafter, the compressed synthesized image is displayed by the LCD 124. The compressed synthesized image may be stored in the recording medium 140 when being displayed by the LCD 124. In detail, when the LCD 124 displays the compressed synthesized image, the LCD 124 may also display a confirmation message indicating whether to store the compressed synthesized image in the recording medium 140 and may store the compressed synthesized image in the recording medium 140 upon the request of the user.

According to the present embodiment, the photographing apparatus 100 respectively sets a plurality of exposure times for a plurality of exposure operations to be performed, and performs the exposure operations according to the results of the setting, thereby obtaining a plurality of images of a subject. Thereafter, the plurality of images obtained through the exposure operations are synthesized (e.g., added up) to obtain a synthesized image. In this manner, it is possible to obtain a synthesized image by effectively synthesizing a plurality of images which respectively correspond to a plurality of diaphragm values and have been obtained by a plurality of exposure operations. Also, according to the present embodiment, an image optimization operation may be performed before and/or after the obtaining of a synthesized image by synthesizing a plurality of images, thereby correcting distortions in images obtained using a typical exposure time division method.

In addition, according to the present embodiment, the photographing apparatus 100 may perform a plurality of exposure operations for a single photographing operation or a plurality of consecutive photographing operations initiated by manipulating the manipulation unit 132. In this manner, the photographing apparatus 100 can obtain a plurality of images of the subject respectively corresponding to a plurality of diaphragm values by exposure time division using a variety of photographing operation patterns.

Moreover, according to the present embodiment, the manipulation unit 132 may serve as a photographing mode selection unit. A diaphragm value and exposure time for each of a plurality of exposure operations to be performed are determined according to a photographing mode chosen by the manipulation unit 132, thereby obtaining various image realization effects according to the chosen photographing mode.

Furthermore, according to the present embodiment, the CPU 128 includes the effect level setting unit 152 which sets an effect parameter to a predetermined level for a synthesized image obtained by a plurality of exposure operations. Thus, it is possible to provide a synthesized image with a variety of effects by simply setting the effect parameter to a predetermined level.

As described above, according to the present invention, it is possible to obtain the same effect as in a weighted summation method by capturing a plurality of images of a subject while appropriately controlling exposure time for each of the images and simply adding up the images and to correct distortions in the images obtained using a typical exposure time division method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus that synthesizes at least two images of a subject, the apparatus comprising:
a memory including a data structure with a plurality of effect parameter values, each effect parameter value of the plurality corresponding to a first value for photographing a wide open-diaphragm image of the subject and a second value for photographing a narrow open-diaphragm image of the subject;

an exposure compensation value calculation unit that calculates a plurality of exposure compensation values for a plurality of exposure operations, each exposure operation of the plurality corresponding to the first and second values of the effect parameter value of the plurality;

an exposure unit that performs the plurality of exposure operations for a plurality of exposure times based on the plurality of exposure compensation values for photographing the subject; and an image synthesis unit that synthesizes a plurality of images obtained by the plurality of exposure operations.

2. The photographing apparatus of claim 1 further comprising an AE level calculation unit that determines an exposure value for photographing the subject.

3. The photographing apparatus of claim 2 further comprising an effect level setting unit that selects an effect parameter value of the plurality relative to the exposure value.

4. The photographing apparatus of claim 1 further comprising a user interface that operates the photographing apparatus, wherein the exposure operations may be performed for a single photographing operation initiated by actuation of a module of the user interface.

5. The photographing apparatus of claim 1 further comprising a user interface that operates the photographing apparatus,
wherein the exposure operations may be performed for a plurality of consecutive photographing operations initiated by actuation of a module of the user interface.

6. The photographing apparatus of claim 1 further comprising a photographing mode selection unit which chooses one of a plurality of photographing modes,
wherein a plurality of diaphragm values and exposure times for the respective exposure operations are determined according to the chosen photographing mode.

7. The photographing apparatus of claim 1 further comprising an image optimization unit that performs an optimization operation at least one of before and after the synthesizing of the images.

8. The photographing apparatus of claim 7, wherein the optimization unit performs a misalignment correction operation for aligning the subject photographed in a plurality of sequential images so that a quality of the synthesized image is not reduced.

9. The photographing apparatus of claim 7, wherein the optimization unit performs at least one of a brightness correction operation for optimizing a brightness level of the synthesized image and a color balance correction operation for optimizing a color balance of the synthesized image.

10. The photographing apparatus of claim 1 further comprising a processing unit in communication with the memory, and wherein the exposure compensation value calculation unit, the exposure unit and the image synthesis unit are algorithms executing on the processing unit.

11. A photographing method for synthesizing at least two images of a subject, the method comprising:
setting an effect parameter value corresponding to a first value for photographing a wide open-diaphragm image of the subject and a second value for photographing a narrow open-diaphragm image of the subject;

calculating exposure compensation values for a plurality of exposure operations, each exposure operation corresponding to the first and second values of the effect parameter value;

performing the plurality of exposure operations for a plurality of exposure times based on the plurality of exposure compensation values for photographing the subject; and synthesizing a plurality of images obtained by the plurality of exposure operations.

12. The photographing method of claim 11 further comprising the step of performing an optimization operation at least one of before and after the synthesizing step.

13. The photographing method of claim 12 wherein the step of performing an optimization operation comprises the step of performing a misalignment correction operation for aligning the subject of the first and second images so that a quality of the synthesized image is not reduced.

14. The photographing method of claim 13 wherein the step of performing an optimization operation further comprises:
correcting a brightness level of the synthesized image; and
correcting a color balance of the synthesized image.

15. The photographing method of claim 11 wherein the synthesizing step comprises adding pixel values of the plurality of images.

16. The photographing method of claim 11 further comprising the step of providing a data structure with a plurality of effect parameter values.

17. The photographing method of claim 16 wherein the plurality of effect parameter values comprise six effect parameter values.

18. The photographing method of claim 11 wherein the first value reduces a first exposure time corresponding to a wide open-diaphragm size and the second value reduces a second exposure time corresponding to a narrow open-diaphragm size.

* * * * *

UNITED STATES PATENT AND TRADEMARK OFFICE
CERTIFICATE OF CORRECTION

PATENT NO.       : 7,620,314 B2                                       Page 1 of 1
APPLICATION NO. : 11/591075
DATED            : November 17, 2009
INVENTOR(S)      : Toshihiro Hamamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this

Twenty-sixth Day of October, 2010

David J. Kappos
*Director of the United States Patent and Trademark Office*